US011552518B2

(12) United States Patent
Cross et al.

(10) Patent No.: US 11,552,518 B2
(45) Date of Patent: Jan. 10, 2023

(54) ARMATURE SEGMENT, ARMATURE AND METHODS FOR ASSEMBLING THEM (71) Applicant: GENERAL ELECTRIC RENOVABLES ESPANA S.L., Barcelona (ES)

(72) Inventors: Andrew Thomas Cross, Niskayuna, NY (US); David Torrey, Galway, NY (US); Michel Schweitzer, Belfort (FR); Bruno Crepel, Belfort (FR); Mickael Portets, Belfort (FR); Roel Schuring, Wolfheze (NL)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/343,214

(22) Filed: Jun. 9, 2021

(65) Prior Publication Data
US 2022/0209604 A1    Jun. 30, 2022

(30) Foreign Application Priority Data

Dec. 30, 2020   (EP) ................................. 20383176

(51) Int. Cl.
*H02K 3/04* (2006.01)
*F03D 9/25* (2016.01)
*H02K 7/18* (2006.01)
*H02K 3/32* (2006.01)
*H02K 3/30* (2006.01)

(52) U.S. Cl.
CPC .............. *H02K 3/04* (2013.01); *F03D 9/255* (2017.02); *H02K 7/183* (2013.01); *F05D 2220/76* (2013.01); *H02K 3/30* (2013.01); *H02K 3/32* (2013.01)

(58) Field of Classification Search
CPC .. H02K 3/04; H02K 3/30; H02K 3/32; H02K 7/183; F03D 9/255; F05D 2220/76
USPC ................................ 310/195, 198, 204, 208
See application file for complete search history.

(56) References Cited

U.S. PATENT DOCUMENTS

| 3,743,867 A | 7/1973 | Smith |
| 6,628,020 B1 | 9/2003 | Tong |
| 2004/0017125 A1 | 1/2004 | Nakamura et al. |
| 2008/0061637 A1 | 3/2008 | Gamble et al. |
| 2011/0285219 A1* | 11/2011 | Zhang .................... H02K 55/04 310/52 |

(Continued)

FOREIGN PATENT DOCUMENTS

| EP | 3078104 A1 | 10/2016 |
| JP | S497604 Y1 | 2/1974 |

(Continued)

OTHER PUBLICATIONS

European Search Report Corresponding to EP20383176 dated Jul. 6, 2021.

*Primary Examiner* — Rashad H Johnson
(74) *Attorney, Agent, or Firm* — Dority & Manning. P.A.

(57) ABSTRACT

The present disclosure relates to armature segments for an armature for an electrical machine. An armature segment may comprise a plurality of coils and an electrically insulating supporting structure providing structural support to the plurality of coils. An armature may comprise a plurality of armature segments. The present disclosure further relates to methods for assembling such armature segments and armature.

14 Claims, 9 Drawing Sheets

(56) References Cited

U.S. PATENT DOCUMENTS

| | | | |
|---|---|---|---|
| 2012/0049531 A1* | 3/2012 | Bray | F03D 9/25 |
| | | | 290/55 |
| 2012/0217750 A1* | 8/2012 | Le Besnerais | H02K 3/12 |
| | | | 310/201 |
| 2013/0181553 A1 | 7/2013 | Wu et al. | |
| 2018/0019642 A1 | 1/2018 | Wang et al. | |
| 2022/0200421 A1* | 6/2022 | Takahashi | H02K 1/27915 |

FOREIGN PATENT DOCUMENTS

| | | |
|---|---|---|
| JP | H05219666 A | 8/1993 |
| WO | WO 01/52393 A1 | 7/2001 |
| WO | WO2020/005221 A1 | 1/2020 |

\* cited by examiner

ARMATURE SEGMENT, ARMATURE AND METHODS FOR ASSEMBLING THEM

STATEMENT REGARDING FEDERALLY SPONSORED RESEARCH OR DEVELOPMENT

This invention was made with Government support under Contract No. DE-EE0008787 awarded by the U.S. Department of Energy (DOE). The Government has certain rights in the invention.

The present disclosure relates to an armature for a superconducting electrical machine. More particularly, the present disclosure relates to armature modules or segments for an armature for a superconducting generator of a wind turbine and methods for assembling such armature segments and armatures.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

The generator in the nacelle may be a superconducting generator. The superconducting generator may have a magnetic field generator and an armature, the magnetic field generator being configured to generate a magnetic field and the armature being configured to support a voltage induced in its windings due to the time-varying magnetic field created by the relative motion of the armature and the magnetic field generator. To this end, the magnetic field generator may be stationary and the armature may be rotatable, e.g. by a shaft, in an example. In particular, the shaft may be a rotor shaft of a wind turbine rotor.

The magnetic field generator may comprise superconducting windings including electrically conductive materials that transition to a superconducting state at a sufficiently low temperature. Thus, the superconductive winding may support very high current densities without incurring any dissipation and thus generate very high magnetic fields, e.g. about 7 T (tesla) or larger. Therefore, a same or more power may be obtained with a superconducting generator with respect to a conventional non-superconducting generator, the superconducting generator being smaller in size and weight than the conventional generator.

Although superconducting generators may be smaller and lighter than a conventional non-superconducting generator, its components are still big and heavy, and thus large spaces and large equipment, e.g. cranes and hoists, are necessary for manipulating them and mounting them. For instance, an armature of a superconducting generator may be between 8 and 10 m in diameter and may weight tens of tons. Thus, assembly may be complex and resource consuming, e.g. in terms of time, workforce, machinery and factory floor space required.

In addition, if the armature includes one or more tubes, e.g. one or more cylindrical tubes for supporting and/or electrically insulating the windings of the armature, the assembly may increase in difficulty. An example of such an armature may be seen in document WO 2020/005221 A1. Such one or more tubes may for example be between 20 and 30 m in length along a circumferential direction, be about 2 m in height along an axial direction and have a thickness about 1 or 2 cm. Therefore, besides large spaces and machinery, huge care may be also needed when handling the components of the armature during its assembly, e.g. the abovementioned one or more tubes.

SUMMARY

In a first aspect of the present disclosure, an armature segment for an armature for a superconducting electrical machine is provided. The armature segment comprises a plurality of coils, the coils being spaced along a circumferential direction; and an electrically insulating supporting structure providing structural support to the plurality of coils.

In accordance with this aspect, an armature may be assembled in an easier and safer way as the size and weight of the armature segments may be more manageable in comparison to an armature including single-body components, e.g. an armature including one or more cylindrical single-piece tubes as mentioned above. In addition, a plurality of armature segments necessary to mount the armature may be manufactured in parallel, and thus an assembly time of the armature may be reduced. The space required for assembly may thus also be more efficiently used. Furthermore, one or more armature segments could be tested before putting the whole armature together, which may facilitate the detecting and fixing of failures at an early stage. This may help to decrease risks once the armature is totally assembled.

Herein, it may be understood that an armature segment refers to a portion of an armature for an electrical machine, e.g. a superconducting generator. When put together, e.g. around an armature support structure, a plurality of armature segments and the armature support structure may form an armature.

In another aspect, a method for assembling an armature segment for an armature for an electrical machine is provided. The method comprises arranging a plurality of coils in a jig and surrounding the plurality of coils arranged in the jig with fibers and resin. The method further comprises curing the resin.

Still in a further aspect, a method for assembling an armature for an electrical machine is provided. The method comprises providing a plurality of armature segments, each armature segment including a plurality of coils spaced along a circumferential direction and an electrically insulating supporting structure providing structural support to the plurality of coils. The method further comprises attaching the plurality of armature segments to an armature support structure.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Even though examples are particularly shown for armature segments and armatures for superconducting generators of wind turbines, the same armature segments and armatures may be used in other electrical machines and/or in other applications as well.

Figure 1:
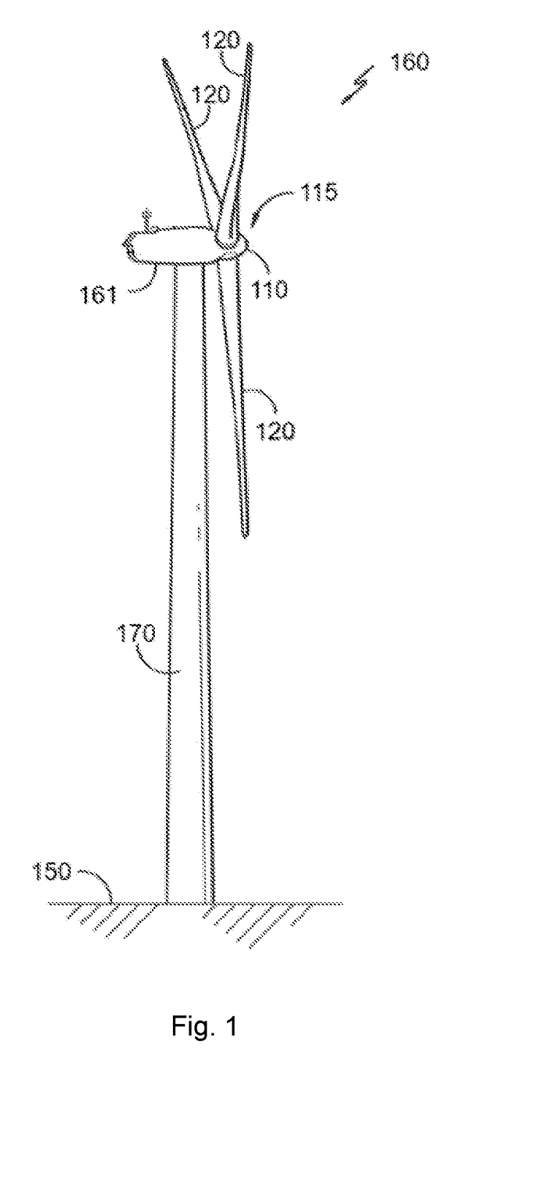
FIG. 1 illustrates a perspective view of one example of a wind turbine.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
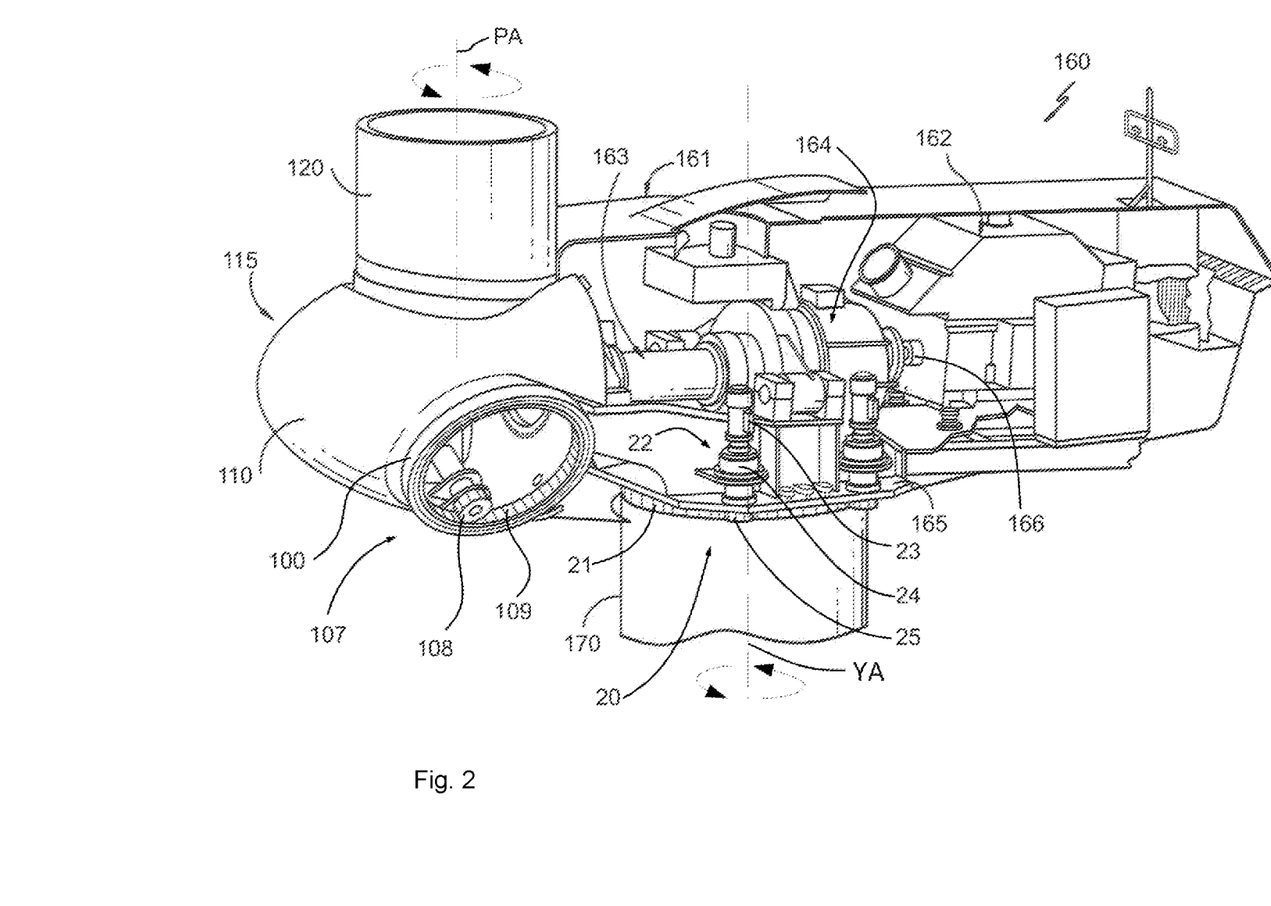
FIG. 2 illustrates a simplified, internal view of one example of the nacelle of the wind turbine of the FIG. 1.

FIG. 2 illustrates a simplified, internal view of one example of the nacelle 161 of the wind turbine 160 of FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 may be rotatably coupled to the tower 170 through a yaw system 20 in such a way that the nacelle 161 is able to rotate about a yaw axis YA or there may be other ways to position the rotor in the desired angle to the wind. If there is a yaw system, such system will usually comprise a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

The generator 162 may be a superconducting generator 200. A schematic exploded view of a superconducting generator 200 according to an example may be seen in FIG. 3. As indicated above, a superconducting generator 200 may include a magnetic field generator 202, e.g. a stationary magnetic field generator 202, and an armature 204, e.g. a rotatable armature 204. The magnetic field generator 202 and the armature may be placed in a housing 206.

Figure 3:
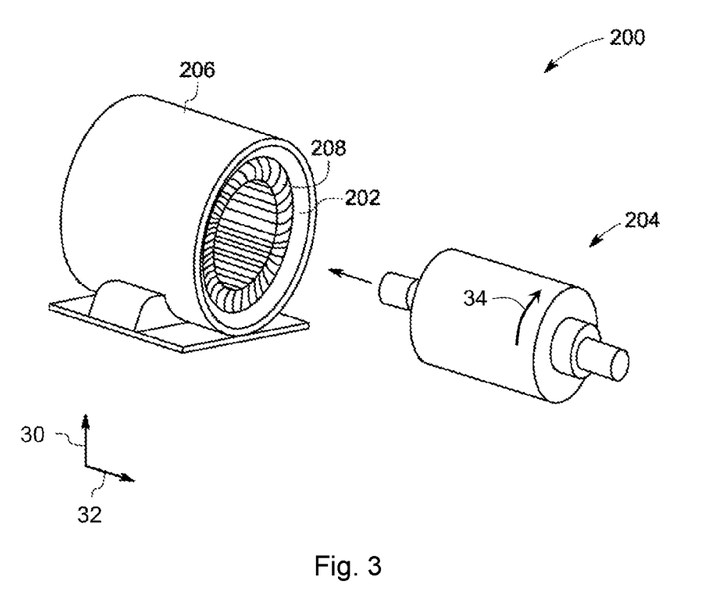
FIG. 3 schematically illustrates an exploded view of a superconducting generator according to an example.

The stationary magnetic field generator 202 may include a superconducting field winding 208. The superconducting field winding 208 may include one or more coils made using electrically conductive materials that transition to a superconducting state at sufficiently low temperatures. Such materials may include niobium tin alloy, niobium titanium alloy, magnesium diboride alloy, any of a number of ceramic materials that have exhibited superconducting properties, or combinations thereof. Often electrically conductive materials such as, but not limited to, copper, aluminum, anodized aluminum, silver, gold, or combinations thereof may be used in combination with superconducting alloys for improved mechanical properties.

The armature 204 may be coupled to the rotor 115 of the wind turbine 160 via the shaft 163 or via both the shaft 163 and the gearbox 164. Due to the rotations of the armature 204, the superconducting generator 200 may generate electrical power by virtue of the voltage induced in armature windings as they move past the magnetic field established by the superconducting field winding 208.

Although the superconducting generator 200 depicted in FIG. 3 is a radial field electric machine, the present invention is also applicable to axial field or transverse field electrical machines.

In some examples, the armature 204 may be (radially) surrounded by the stationary magnetic field generator 202, e.g. as illustrated in FIG. 3. In some other examples, the stationary magnetic field generator 202 may be (radially) surrounded by the armature 204 (not shown). Still in some other examples, the stationary magnetic field generator 202 and the armature 204 may be disposed side-by-side (not shown).

Reference numerals 30 and 32 respectively represent a radial direction and an axial direction of the superconducting generator 200, and thus of the armature 204 as well. Reference numeral 34 represents a circumferential direction of the superconducting generator 200, and thus of the armature 204 too.

In an aspect of the invention, an armature for a superconducting generator, e.g. armature 204, includes two or more armature segments 300. A schematic example of an armature segment 300 is depicted in FIG. 4.

Figure 4:
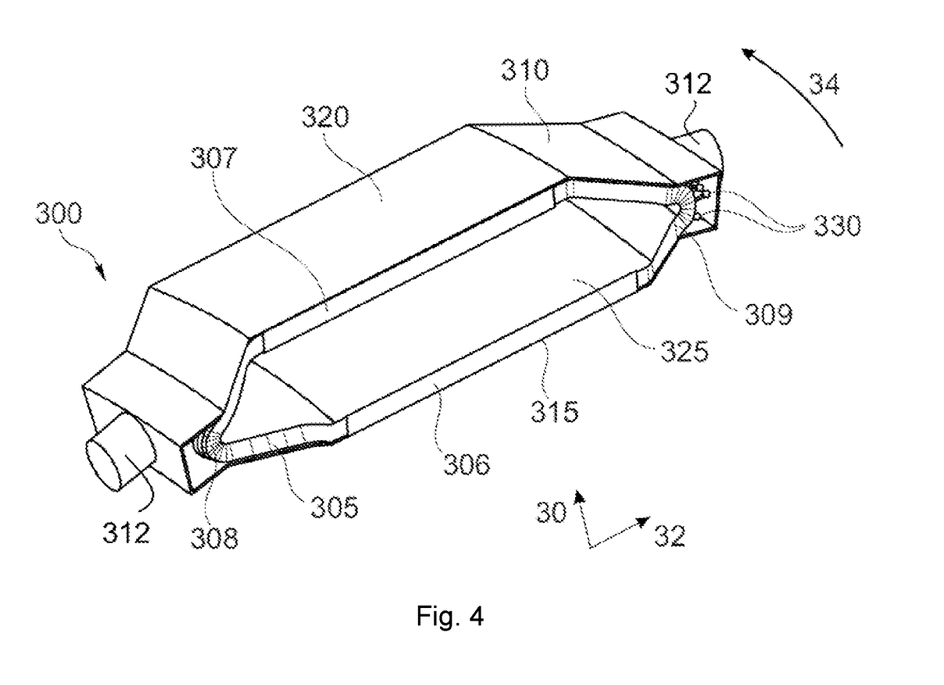
FIG. 4 schematically illustrates an example of an armature segment for a superconducting generator.

The armature segment 300 of FIG. 4 comprises a plurality of coils 305. The coils 305 are spaced along a circumferential direction 34. The armature 300 further comprises an electrically insulating supporting structure 310 providing structural support to the plurality of coils 305.

In the example of FIG. 4, the electrically insulating supporting structure 310 comprises a first electrically insulating wall 315 and a second electrically insulating wall 320. The second electrically insulating wall 320 is placed at a radial distance from the first electrically insulating wall 315 and the plurality of coils 305 is placed between the first 315 and second 320 electrically insulating walls. The first electrically insulating wall 315 is closer to a rotational shaft 163, 166 in a radial direction than the second electrically insulating wall 320.

A coil may include a first side portion 306, a second side portion 307 and two end portions 308, 309. The end portion 309 may be the one having electrical connections 330, e.g. for carrying electrical current out of the coils 305. A first side portion 306 may include a portion of the coil substantially parallel to an axial direction which is closer to the first electrically insulating wall 315 than to the second electrically insulating wall 320. A second side portion 307 may include a portion of the coil substantially parallel to an axial direction which is closer to the second electrically insulating wall 320 than to the first electrically insulating wall 315. In other words, the first side portion 306 is closer to a rotational shaft 163, 166 in a radial direction than the second side portion 306. Such a coil may be also seen in FIG. 5.

In some examples, the electrically insulating supporting structure 310 may further comprise an electrically insulating coil side separator 325 between a first side portion 306 and a second side portion 307 of the coils of the plurality of coils 305 and extending along a circumferential direction 34.

Figure 5:
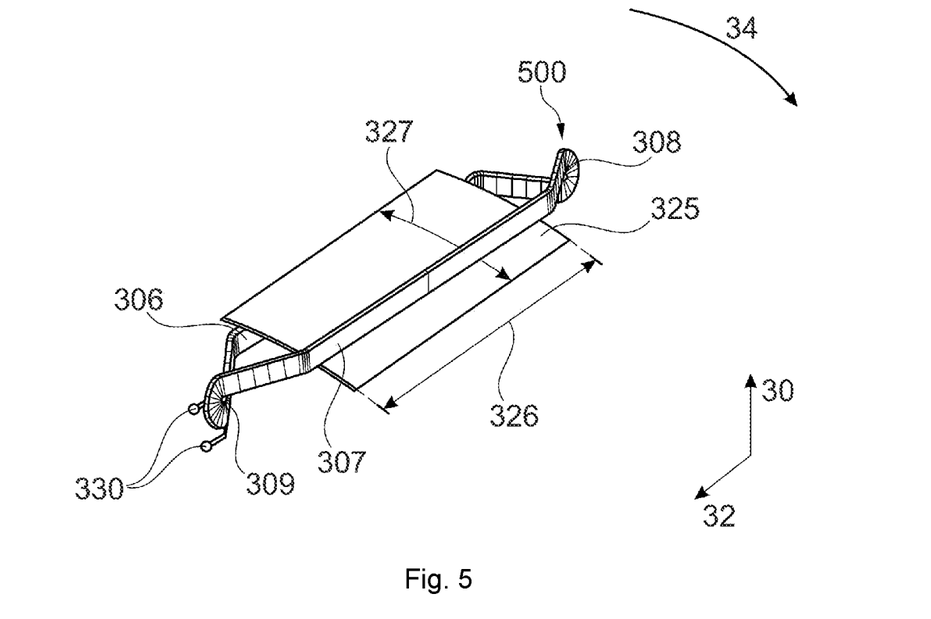
FIG. 5 schematically illustrates an example of a coil of an armature segment and an electrically insulating coil side separator of another example of an armature segment for a superconducting generator.

In some examples, the electrically insulating coil side separator 325 may be a curved plate, e.g. as shown in FIG. 5. A plurality of curved plates 325 may together form a tubular or annular structure. Each of the curved plates 325 of this example may form a segment of the tubular structure.

The example of FIG. 5 shows a coil 500 and an electrically insulating coil side separator 325 threaded through the coil 500. The coil 500 comprises a first side portion 306, a second side portion 307 and two end portions 308, 309. In FIG. 5, an axial length 326 of the electrically insulating coil side separator 325 extends partially along the portions of the coil 500 which are parallel to an axial direction 32. However, in other examples, like the example of FIG. 4, an axial length of the electrically insulating coil side separator 325 extends totally along the portions of a coil 500 which are parallel to an axial direction 320 and also beyond them, towards the ends 308, 309 of the coil 500. A circumferential length 327 of the electrically insulating coil side separator 325 extends along a circumferential direction 34.

In a similar manner, the first electrically insulating wall 315 and the second electrically insulating wall 320 may each have an axial length and a circumferential length. An axial length of the first 315 and second 320 electrically insulating walls may in general extend substantially parallel to an axial direction 32, although it may deviate from this direction, e.g. at the ends 308, 309 of the coils 305.

As it can be also seen in the examples of FIGS. 4 and 5, the first side portion 306 and the second side portion 307 of a coil 500 of the plurality of coils 305 are offset in a circumferential direction 34. In particular, in these examples, these portions 306, 307 are radially and circumferentially displaced from one another. These portions 406, 307 connect between them via the two end portions 308 and 309.

Throughout this disclosure, the coils in the plurality of coils 305 may be made of electrically conductive materials including one or more of copper, aluminum, silver and gold.

Throughout this disclosure, any of the first 315 and second 320 electrically insulating walls and the electrically insulating coil side separator 325 may be formed using fiber-reinforced composite materials, e.g. fiber reinforced polymers including one or more of G-10, G-11, F-24 and FR-4.

FR-4 is a NEMA ("national Electrical Manufacturers Association") grade designation for glass-reinforced epoxy laminate material FR-4 is a composite material composed of woven or non-woven fiberglass with an epoxy resin binder that is flame resistant. Herein FR stands for flame retardant. G-10 and G-11 are high-pressure fiberglass epoxy laminates. G-10 is slightly stronger than G-11 while G11 is a better insulator and may better withstand higher temperatures.

Alternatively, any other composite material may be used to that is able to withstand the temperature, mechanical and electric loads to let the armature function. This includes but is not limited to a matrix material that is based on polyesters, on vinyl esters or polyamide.

Throughout this disclosure, an armature segment 300 may include one or more coils 500. In some examples, an armature segment 300 may include between 10 and 30 coils. In some examples, the plurality of coils 305 may comprise one or two or any larger number of poles.

The space between coils of the plurality of coils 305, i.e. in a circumferential direction 34, may be used for used for cooling the coils 305 and/or the armature segment 300. I.e., in some examples, the armature segment 300 may further comprise cooling channels in the space separating the coils. In an example, a cooling fluid such as air may simply be passed through such spacing between coils. In some other examples, electrically insulating spacers (not shown) may be included between a first 306 side portion of a coil and a first 306 side portion of an adjacent coil. Additionally or alternatively, electrically insulating spacers may be included between a second 307 side portion of a coil and a second 307 side portion of the adjacent coil.

One or more of such electrically insulating spacers may include one or more cooling channels configured to facilitate a flow of a cooling fluid therethrough to aid cooling of the armature segment coils 305. The electrically insulating spacers and the one or more cooling channels may have an axial length extending at least partially in an axial direction 32. I.e., these elements may run in general substantially parallel to an axial direction 32 although they may deviate from this direction, e.g. at the ends 308, 309 of the coils 305.

Cooling ports 312 may be provided to direct a fluid, e.g. air, into and of out the armature segment 300 for cooling it in any of these examples. In some examples, the electrically insulating supporting structure 310 may include two cooling ports 312, e.g. one at each end along an axial direction 32 as shown in FIG. 4. In some other examples, the electrically insulating supporting structure 310 may include two or more cooling ports 312 at each of its ends along an axial direction 32. The cooling ports 312 may have a tubular shape, as in the example of FIG. 4.

In some examples, the armature segment 300 may include a plurality of cooling channels 700. The plurality of cooling channels 700 may in some examples include cooling channels such as the one 705 illustrated in FIG. 8, i.e. a cooling channel 705 which may be configured to conform in shape to the coil 500. Further information concerning such a cooling channels 700 is provided in relation to FIG. 8 below.

In an example, once joined to one another, the plurality of coils 305 and the electrically supporting structure 310 may be surrounded with fibers and resin and the resin may subsequently be cured. In some other examples, the electrically supporting structure 310, e.g. the first 315 and second 320 electrically insulating walls, and optionally the electrically insulating coil side separator 325, may be surrounded with fibers and resin and cured first, and then joined to the plurality of coils 305. The armature segment according to any of these examples may be arranged within a mold; fibers, micro fibers, or fiber mats may be arranged within the mold; and then resin may be introduced in the mold.

In some other examples, one or more armature segment component may be infused with micro-particles. In an example, at least a plurality of coils may be arranged within a mold, infused with micro-particles and then covered in resin.

Active infusion pressure and/or vacuum assisted resin impregnation may be used in some examples, e.g. as indicated further below.

Figure 6:
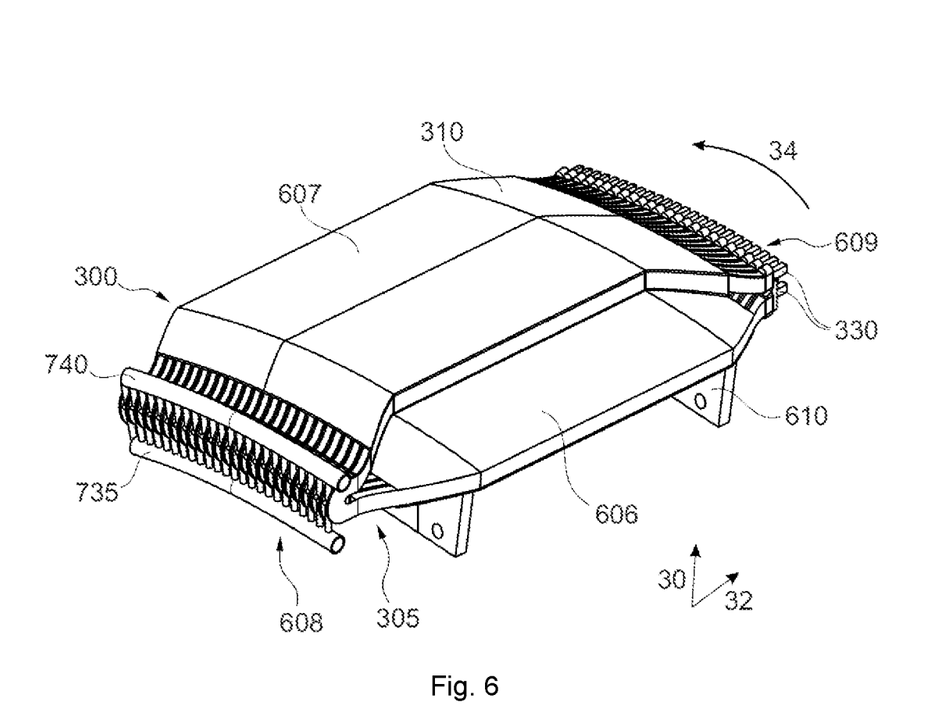
FIG. 6 schematically illustrates another example of an armature segment for a superconducting generator.

Another schematic example of an armature segment 300 is illustrated in FIG. 6. The armature segment 300 of the example of FIG. 6 also comprises a plurality of coils 305, the coils being spaced along a circumferential direction 34. The armature segment 300 further comprises an electrically insulating supporting structure 310 providing structural support to the plurality of coils 305.

In this example, the electrically insulating supporting structure 310 comprises a composite including fibers and resin surrounding the plurality of coils 305. Therefore, electrically insulating walls 315, 320 and optionally an electrically insulating coil side separator 325 are no longer needed to provide structural support to the plurality of coils 305 in this example. The composite may provide the necessary support.

Similarly to a coil 500, which includes a first side portion 306, a second side portion 307 and two end portions 308, 309, the plurality of coils 305 may include a first central portion 606, a second central portion 607 and two plurality of coils end portions 608, 609. The first central portion 606 is closer to a rotational shaft 163, 166 in a radial direction than the second central portion 607. Accordingly, herein surrounding may refer to totally covering, e.g. wrapping around, at least the first central portion 606 of the plurality of coils 305 and at least the second central portion 607 of the plurality of coils 305, as depicted in FIG. 6. A fiber mat or fiber bundles may be used in some examples to surround the plurality of coils 305, and optionally also any other component in the assembly e.g. a jig 610, prior to the addition of resin and curing.

In some examples, the armature segment 300 may comprise a jig 610 in which the plurality of coils 305 has been arranged. In some of these examples, the jig 610 may be part of the composite, e.g. due to the fact that it may have also been surrounded by a fiber mat, covered in resin and cured. For instance, in the example of FIG. 6, the composite of armature 300 further surrounds a jig 610 in which the plurality of coils has been arranged. This may enhance the robustness of the armature segment 300 and the accuracy of the positioning of the individual components in it.

Figure 11:
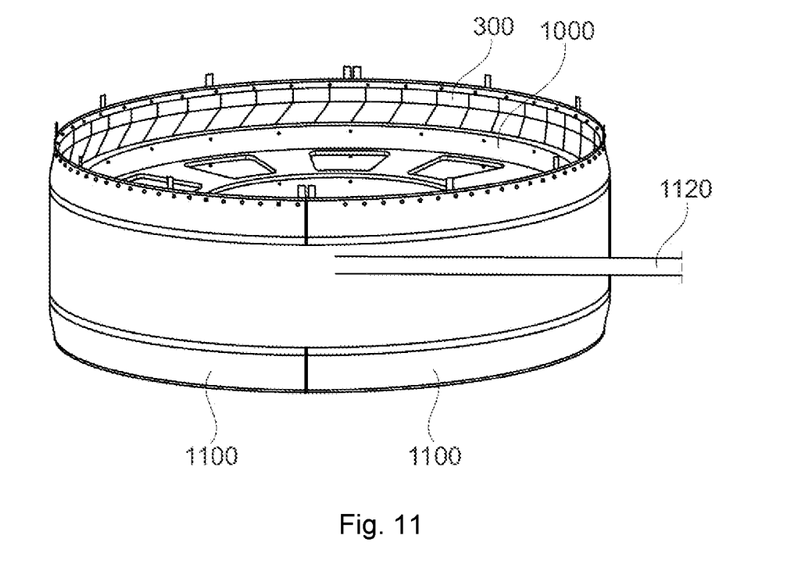
FIG. 11 schematically illustrates an armature segment being wrapped with a sleeve.
Figure 12:
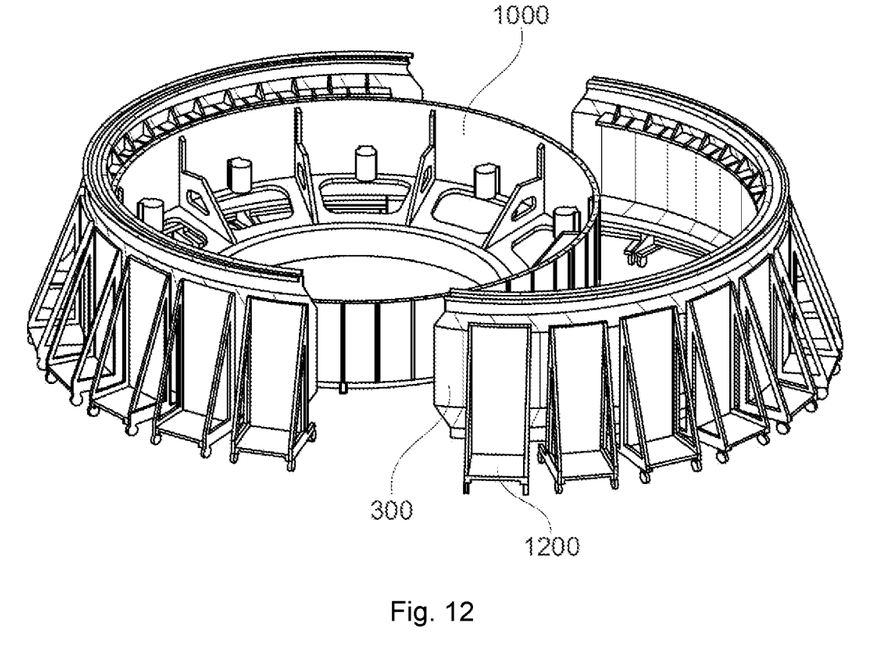
FIG. 12 schematically illustrates another example of an assembly of an armature for an electrical machine.

In some examples, the jig 610 may have holes through which the armature module 300 may be attached to an armature support structure 1000 (see e.g. FIGS. 11 and 12).

Figure 7:
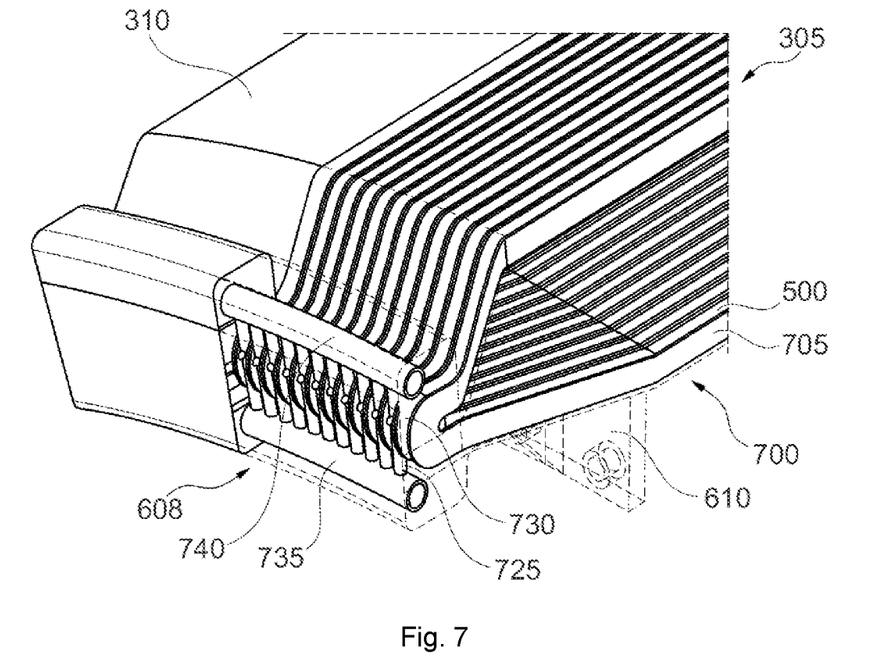
FIG. 7 schematically illustrates an alternative to the schematic example of the armature segment of FIG. 6.

In FIG. 7, which shows an alternative to the schematic example of the armature segment 300 of FIG. 6, an end 608 of the plurality of coils 305 is further surrounded, i.e. completely covered or wrapped, with a composite including fibers and resin. The end 608 not having electrical connections 330, e.g. for carrying electrical current out of the coils 305, may be the one being further covered with the composite including fibers and resin.

In the example of FIG. 7, only a portion of the electrically insulating supporting structure 310 of the armature segment 300 has been included in order to show the underlying plurality of coils 305. Besides the plurality of coils 305, a plurality of cooling channels 700 may also be seen. In this example, a cooling channel 705 separates two adjacent coils 500. In other words, the plurality of channels 700 may lie in a circumferential direction 34. In this example, a plurality of cooling channels 700 may be configured to fit around, i.e. conform in shape to, the plurality of coils 305. An example of a single cooling channel 705 may be seen in FIG. 8. As it can be appreciated when comparing the cooling channel 705 of FIG. 8, the coil 500 of FIG. 5, and these elements put together in FIG. 7, the cooling channel 705 may be configured to conform in shape to the coil 500.

Such cooling channels 700 may also be used in the armature segment 300 of the examples of FIG. 4.

Figure 8:
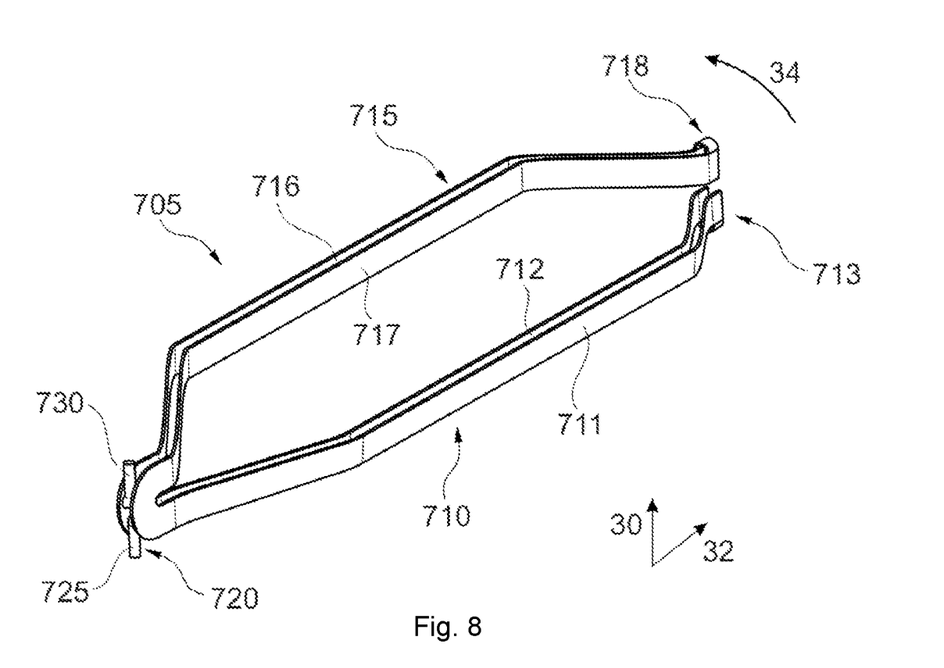
FIG. 8 schematically illustrates an example of a cooling channel for an armature segment.

The cooling channel 705 may include a first cooling portion 710 and a second cooling portion 715. The first cooling portion 710 of the channel 705 may have two first cooling passages 711, 712, each passage 711, 712 configured to follow, e.g. extend substantially parallel to, each of the sides of the first side portion 306 of the coil 500 and, partially, the sides of the two end portions 308, 309 of the coil 500. First cooling passages 711 and 712 may meet at a first separate end 713 of the first portion 710 of the cooling channel 705 such that a fluid may pass from a first cooling passage to the other first cooling passage. Likewise, the second cooling portion 715 of the channel 705 may have two second cooling passages 716, 717, each passage 716, 717 configured to follow, e.g. extend substantially parallel to, each of the sides of the second side portion 307 of the coil 500 and, partially, the sides of the two end portions 308, 309 of the coil 500. Second cooling passages 716 and 717 may meet at a second separate end 718 of the second portion 715 of the cooling channel 705 such that a fluid may pass from a second cooling passage to the other second cooling passage.

The sides of the first 306 and second 307 side portions of the coil 500 may refer to the portions of the coil 500 which would come into contact with other coils 500 if the coils of the plurality of coils 305 were not spaced along a circumferential direction, e.g. by cooling channels. In an example, these sides may lie in a plane substantially parallel to the plane formed by the radial 30 and the axial 32 direction.

The first 713 and second 718 separate ends at which the first cooling passages 711, 712 and the second cooling passages 716, 717 meet, respectively, may be configured to be placed near to, e.g. over, the end portion 309 of the coil 500 which has the electrical connections 330 to e.g. output the induced electrical current on the coil 500. The first cooling portion 710 and the second cooling portion 715 may also meet at a joint end 720 of the cooling channel 705. The joint end 720 may be opposite to the first 713 and second 718 separate ends.

Joint end 720 may include an inlet 730 and an outlet 725 for a fluid which may go through the cooling channel 705 in order to cool a coil 500. Inlet 725 and outlet 730 may be configured to be connected to a distributor of a cooling manifold. Such a distributor may comprise first 735 and second 740 distributing conduits through which a fluid may be delivered to the inlets 730 of the plurality of coils 305 and collected from the outlets 725 of the plurality of coils 305. Although an inlet and an outlet have been labeled as 730 and 725, respectively, in FIGS. 7 and 8, it is noted that label 725 may refer to an inlet and label 730 may refer to an outlet in other examples.

The cooling channels 700 may be metallic and/or plastic. In an example, the cooling channels 700 may include polytetrafluoroethylene (PTFE), and more in particular may be formed by a PTFE material impregnated with a thermally conductive additive. This may increase the cooling channel's 705 thermal conductivity.

In an example, these kind of cooling channels 700 may be used in the armature segment 300 of the examples of FIGS. 4 and 5, e.g. instead of introducing spacers including cooling channels between the coils. Cooling channels 700 as described in relation to FIG. 8 may enable a more efficient cooling of the armature segment 300, e.g. by cooling the ends 308 (608), 309 (609) of the plurality of coils 305.

An armature segment 300 lacking ferromagnetic teeth, i.e. the absence of ferromagnetic material close to the armature coils 305 as the one in FIGS. 4, 6 and 7, may ease the insulation requirements of the armature coils 305. Also, due to use of non-ferromagnetic and electrically insulating materials in the electrically insulating support structure 310, the armature coils 305 may be operated at increased magnetic fields produced by the superconducting field winding 208.

A plurality of armature segments 300 such as the ones described in the above examples may be used to assemble an armature 204 for an electrical machine, e.g. a superconducting generator 200. To this end, the armature segments 300 may have complementary shapes. In some examples, a plurality of armature segments such as the one described with respect to FIGS. 4 and 5 may be attached to one another in order to assemble an armature 204. In some other examples, a plurality of armature segments such as the one described in relation to FIGS. 6 and 7 may be used to form an armature 204. Therefore, an armature for an electrical machine comprising a plurality of segments as described throughout this disclosure attached to an armature support structure 1000 along a circumferential direction may be provided. Several possibilities to assembly a plurality of armature segments 300 into an armature 204 will be indicated afterwards.

Two or more armature segments 300 may be attached in order to mount the armature 204. In some examples, an armature 204 may comprise between 20 and 50 armature segments 300.

Figure 13:
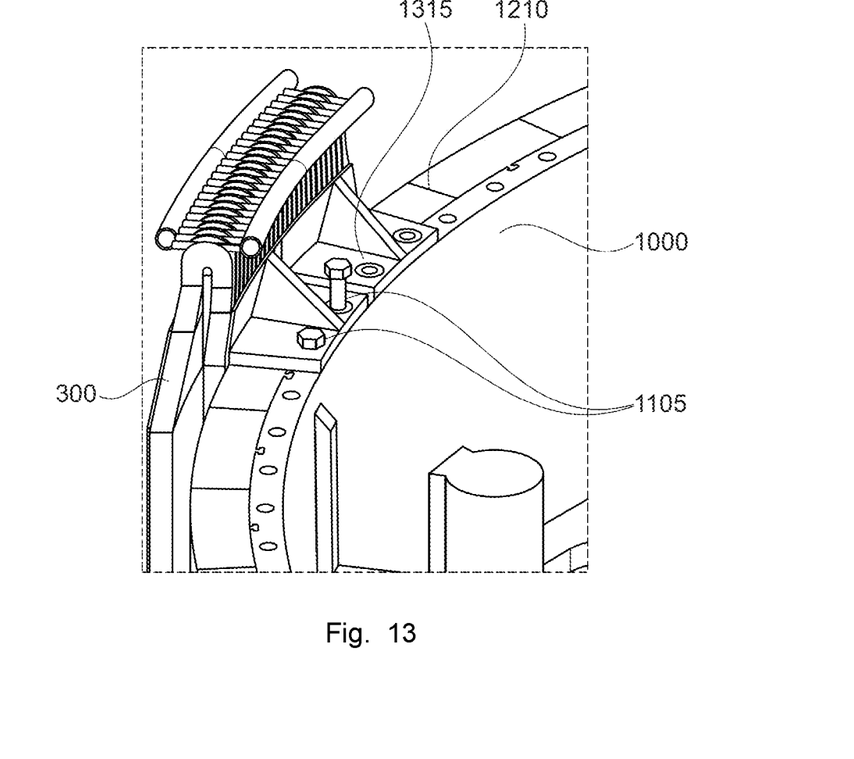
FIG. 13 schematically illustrates an example of an attachment of an armature segment to an armature support structure.

In some examples, an armature 204 may include a shield 1210 (see FIG. 13). The shield 1210 may be located between the armature support structure 1000 and the plurality of segments 300. The shield 1210 may include a ferromagnetic material. For example, the shield 1210 may include electrical steel. In some examples, the shield 1210 may be laminated. This may help to reduce losses associated with induced currents in the shield 1210 and the support structure 1000. The shield 1210 may also encourage a magnetic flux from the superconducting field winding 208 to remain in the radial direction 30. This may improve the magnetic coupling between the magnetic field generated by the field generator 202 and the armature coils 305.

A superconducting generator 200 comprising a field generator 202, e.g. a stationary field generator, a superconducting field winding 208 placed concentric to the field generator 202 and an armature 204 comprising a plurality of armature segments 300 as disclosed herein may be provided.

Furthermore, a wind turbine 160 comprising a wind turbine tower 170, a nacelle 161 on top of the tower 170, a rotor 115 including one or more wind turbine blades 120 mounted to the nacelle 161 and a superconducting generator 200 in the nacelle 161 as indicated above may be provided.

Figure 9:
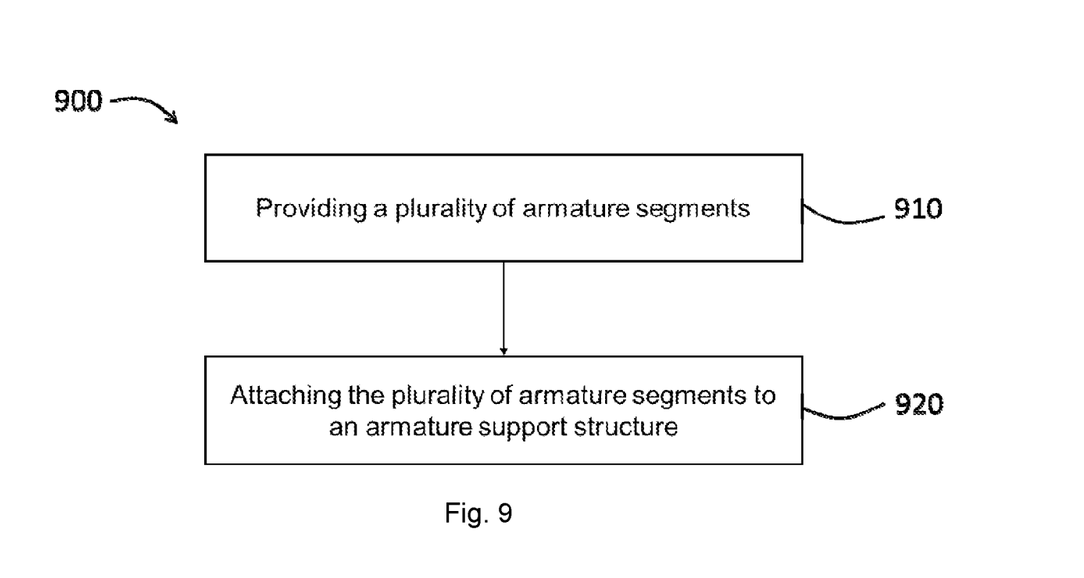
FIG. 9 shows a flow chart of an example of a method for assembling an armature for an electrical machine.

FIG. 9 shows an example of a method 900 for assembling an armature for an electrical machine. For instance, the armature 204 of FIG. 3 may be assembled with such a method.

The method comprises, at block 910, providing a plurality of armature segments, such as the armature segments 300 with respect to any of FIGS. 4-8.

In this regard, each armature segment 300 includes a plurality of coils 305 and an electrically insulating supporting structure 310 providing structural support to the plurality of coils 305.

The method further comprises, at block 920, attaching the plurality of armature segments 300 to an armature support structure 1000. The armature segments 300 may have complementary shapes. The number of armature segments 300 to be attached to the armature support structure 1000 may for instance be chosen depending on the size (e.g. a diameter) of the armature 204 and the number of coils 500 included in the armature segment 300. In an example, between 20 and 50 armature segments 300 may be attached to an armature support structure 1000.

Figure 10A:
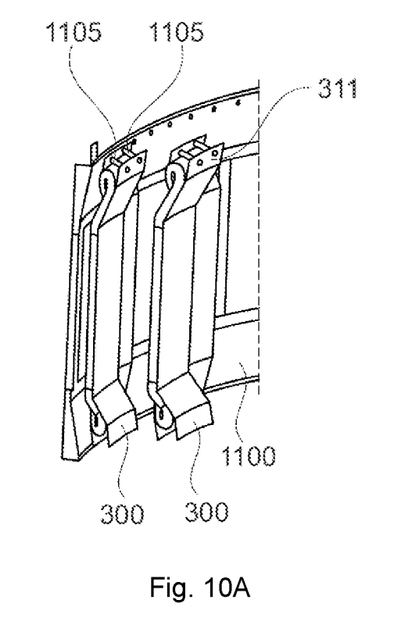
FIGS. 10A and 10B illustrate an example of an assembly of an armature for an electrical machine.
Figure 10B:
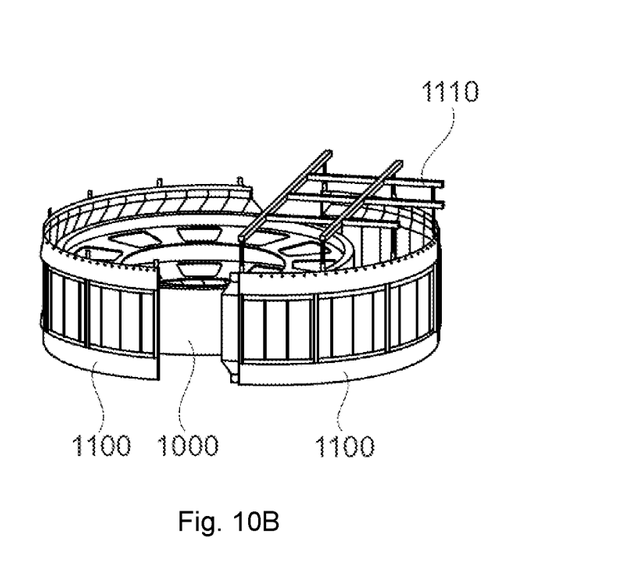

An example of armature support structure 1000 may be seen in FIG. 10B. In this figure, the armature support structure 1000 has a ring shape such that a plurality of armature segments 300 may be attached to it. In some other examples, the armature support structure 1000 may have a polygonal shape in cross-section (plane including the radial direction 30 and the circumferential direction 34). I.e., the armature support structure 1000 may include a plurality of faces, and the number of faces may e.g. be equal to the number of armature segments 300 to be attached to it. In some of these examples, an armature support structure 1000 in cross-section may be a polygon between 20 and 50 faces or sides.

In some examples, an armature support structure 1000 may include a solid piece (i.e. a single non-laminated piece) of one or more ferromagnetic materials. In some other examples, an armature support structure 1000 may include laminations of one or more ferromagnetic materials, e.g. a single laminated piece. This may help to reduce eddy currents.

In some examples, attaching a plurality of armature segments 300 to the armature support structure 1000 may comprise attaching a plurality of armature segments 300 to an outer armature segment support 1100 before attaching the plurality of armature segments 300 to the armature support structure 1000. This may be illustrated in FIGS. 10A and 10B.

FIG. 10A shows how, in some of these examples, fasteners 1105, e.g. two bars, screws or pins 1105 may be used to pass through two holes in the electrically insulating supporting structure 310, e.g. in an end 311 of the electrically insulating supporting structure 310 near to the electrical connections 300 of the coils 305, and through another two holes in the outer armature segment support 1100. The bars, screws or pins 1105 may be secured e.g. by nuts. A single such fastener or more than two fasteners may be used in some other examples.

The outer armature segment support 1100 may have a half-ring shape in some examples, as illustrated in FIG. 10B. When a plurality of armature segments 300 has been attached to the outer segment support 1100, the outer segment support 1100 may be moved close to the armature support structure 1000 (or the other way around) and the armature segments 300 may be attached to the armature support structure 1000. Adhesive and/or fasters which may e.g. include bolts and nuts, and rivets, may be used to join the armature support structure 1000 and the armature segments 300. A crane 1110 may be used to move the outer segment support 1100 with the armature segments 300 and/or the armature support structure 1000.

To complete the armature 204 assembly, another outer segment support 1100 may be provided, a plurality of armature segments 300 may be attached to it and then the plurality of armature segments 300 may be attached to the armature support structure 1000. The two outer segment supports 1100 and/or the armature segments 300 attached to their ends may be joined to one another, e.g. with adhesive and/or fasteners 1105. This may increase the robustness of the armature 204.

In some examples, as shown in FIG. 11, the resulting structure (i.e. the attached plurality of armature segments) may be wrapped in a cover 1120, e.g. a composite sleeve, wrapper or strip. This may provide for additional support and robustness of the armature 204.

The outer armature segment support 1100 may have other shapes and may have a circumferential length different than that of a half-ring, e.g. a shorter circumferential length. For example, the outer armature segment support 1100 may include a plurality of surfaces, e.g. flat or curved surfaces, wherein the number of surfaces corresponds to the number of armature segments 300 to be attached to it.

In some examples, attaching a plurality of armature segments to the armature support structure comprises using a plurality of armature segment assembly carts 1200 to move a plurality of armature segments 300 to be attached to the armature support structure 1000.

An example of a plurality of carts 1200 moving a plurality of armature segments 300 is illustrated in FIG. 12. In this example, a plurality of armature segments 300 may be placed on a plurality of armature segment assembly carts 1200 and may be attached to one another previously to attach the plurality of armature segments 300 on the carts 1200 to the armature support structure 1000, as shown in the right portion of the figure. The segment assembly carts 1200 may be moved towards the armature support structure 1000, e.g. with motorized dollies.

Any number of armature segments 300 may be put together before approaching the armature support structure 1000. For instance, as shown in FIG. 12, half of the armature segments 300 which will form the armature 204 may be put together, but joining more or less armatures segments 300 is possible.

Also, putting together a plurality of armature segments 300 before attaching them to the armature support 100 may be performed in more than one stage, i.e. armature segments 300 may be grouped into various sets and then these sets may be grouped into a bigger set. A set may comprise one or more armature segments 300.

In addition, an armature segment 300 may not be attached to another armature segment 300 before attaching them to the armature support structure 1000, but it may be attached to the armature support structure 1000 and then attached to another armature segment 300. In an example, each armature segment 300 of a plurality of armature segments may be attached to the armature support structure 1000. Then, the armature segments 300 may be attached to one another. Again, one or more of adhesive and fasteners 1105, e.g. bolts and nuts, may be used to attach the armature segments 300 to the armature support structure 1000. One or more of adhesive and fasteners 1105, e.g. bolts and nuts, may be used to attach the armature segments 300 to one another.

In some of these examples, as indicated with respect to FIG. 11, the resulting structure may be wrapped in a sleeve 1120, e.g. a composite sleeve.

In some examples, attaching a plurality of armature segments to the armature support structure comprises attaching a shield 1210 to the armature support structure 1000 before attaching the plurality of armature segments 300 to the armature support structure 1000. An example of a shield 1210 may be seen in FIG. 13. In an example, shield 1210 laminations may be stacked around the armature support structure 1000.

In some examples, providing a plurality of armature segments (at block 910) may further comprise arranging a plurality of cooling channels 700 with the plurality of coils 305. In the example of FIG. 4, this may be done before attaching the assembly of the plurality of coils 305 and the cooling channels 700 to the first electrically insulating wall 315. In the example of FIGS. 6 and 7, this may be done before surrounding the assembly of the plurality of coils 305 and the cooling channels 700 with fibers and resin.

In some examples, the plurality of cooling channels 700 may include cooling channels 700 configured to conform in shape to, i.e. fit around, the plurality of coils 305. A plurality of cooling channels 700 configured to conform in shape to the plurality of coils 305 may be understood as the plurality of cooling channels 700 may conform in shape to the plurality of coils 305 individually. I.e., a plurality of cooling channels 700 including channels such as the one illustrated in FIG. 8 may be provided and each conforming cooling channel 705 may conform in shape, and thus be fitted, to a corresponding coil 500.

In some examples, providing a plurality of armature segments (at block 910) includes attaching a plurality of coils 305 to a first electrically insulating wall 315; and attaching a second electrically insulating wall 320 to the plurality of coils 305 already attached to the first insulating wall 315. This way, an armature segment 300 may be assembled. More armature segments 300 may be assembled and provided in the same way.

In some of these examples, providing a plurality of armature segments further includes introducing an electrically insulating coil side separator 325 between a first side portion 306 and a second side portion 307 of the coils of the plurality of coils 305 in a circumferential direction 34.

In some examples, providing a plurality of armature segments (at block 910) includes arranging a plurality of coils 305 in a jig 610, surrounding the plurality of coils 305 arranged in the jig 610 with fibers and resin; and curing the resin. In some examples, surrounding the plurality of coils 305 with fibers may comprise surrounding them with a fiber mat or fiber bundles. In some examples, the jig 610 may be also surrounded with fibers and resin.

In some other examples, providing a plurality of armature segments (at block 910) includes arranging a plurality of coils 305 in a jig 610, surrounding the plurality of coils 305 arranged in the jig 610 with micro-particles and resin; and curing the resin. Surrounding the plurality of coils with micro-particles may include infusing the coils with micro-particles.

Figure 14:
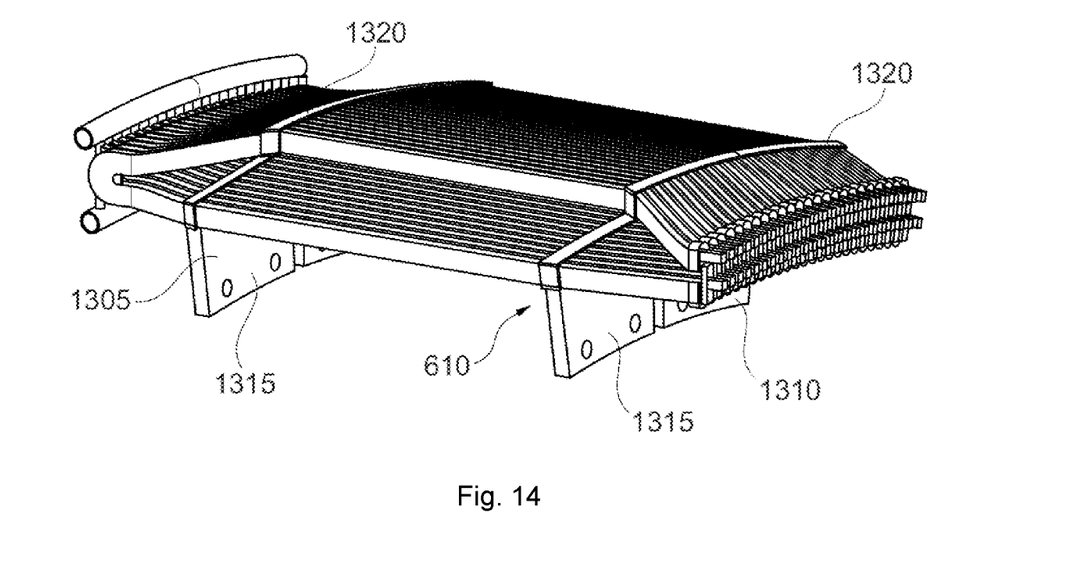
FIG. 14 schematically illustrates an example of a plurality of coils arranged in a jig.

An example of a plurality of coils 305 arranged in a jig 610 may be seen in FIG. 14. In this example, a jig 610 includes two jig supports 1305, 1310. Each support 1305, 1310 includes a leg 1315 and a gripper 1320. The plurality of coils 305 may be supported by the legs 1315 and kept together by the gripper 1320. In some examples, one jig support 1305 may be used. In some other examples, more than two jig supports 1305 may be used. Where two or more jig supports 1305 are used, two or more of the supports 1305 may be joined. I.e., they may be provided as a single piece instead of two or more pieces. Also, in some examples, a leg 1315 and a gripper 1320 may be provided as a single piece whereas in some other examples they may be provided as two separate pieces. In some examples, a leg 1315 may be attached to an armature support structure 1000 as illustrated in FIG. 13. In the example of FIG. 13, fasteners 1105 such as bolts are used to attach an armature segment 3000 to the armature support structure 1000.

In some examples, active infusion pressure and/or vacuum assisted resin impregnation may be used for providing a plurality of armature segments. In order to maintain vacuum and/or to guide a pressured flow of resin, an armature segment may be placed on a sufficiently vacuum or pressure tight table or mold that follows the shape of the armature segment, whilst it is covered on the other side with a foil to sufficiently maintain the vacuum and/or with another section of a mold or a plurality of mold sections that together enable to sufficiently maintain vacuum and or guide the pressured flow of resin through the assembly. Such molds may be equipped with inlet and outlet channels to maintain the right pressure/vacuum conditions, to provide outlet for a potential surplus flow of resin and/or to provide access to probes or sensors. In some examples, the mold may be partially assembled prior to positioning armature segment components in it. In some other examples, the mold may be built up alongside or partially after the positioning of armature segment components.

In some examples, one or more spacers, e.g. electrically insulating spacers, may be introduced between two coils, e.g. adjacent coils. One or more spacers may be additionally or alternatively introduced between two portions of a same coil. Spacers may also separate other components of an armature segment 300.

Figure 15:
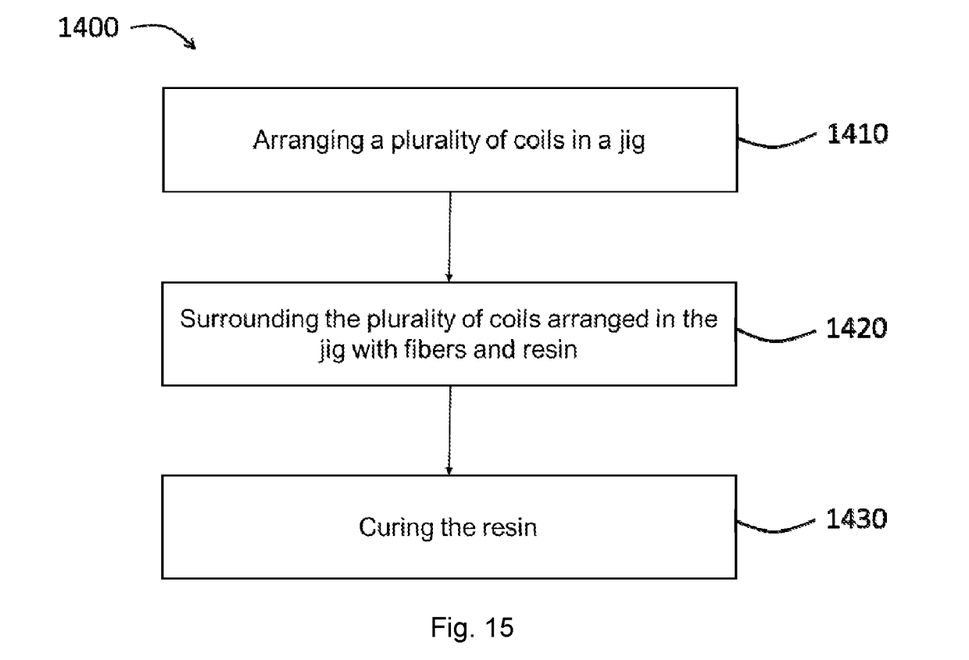
FIG. 15 shows a flow chart of an example of a method for assembling an armature segment for an electrical machine.

Once assembled, the armature 204 may be attached to one or more generator 162 components. As schematically illustrated in FIG. 2, in some examples the armature 204 may be coupled to the rotor 115 of the wind turbine 160 via the shaft 163 or via both the shaft 163 and the gearbox 164. The armature segments 300 and/or the armature 204 may comprise suitable fittings, attachments or connecting elements for attachment to one or more generator components. Still in a further aspect, a method 1400 for assembling an armature segment 300 for an armature 204 for an electrical machine, e.g. a superconducting generator 202, is provided. A flowchart showing this method is illustrated in FIG. 15. The method 1400 comprises, at block 1410 arranging a plurality of coils 305 in a jig 610, surrounding the plurality of coils 305 arranged in the jig 610 with fibers and resin at block 1420, and curing the resin at block 1430.

In some examples, the method 1400 may further comprise arranging a plurality of cooling channels 700, optionally a plurality of cooling channels 700 configured to fit around, i.e. conform in shape to, the plurality of coils 305, with the plurality of coils 305.

The explanations concerning this aspect and provided above in relation to details of assembling an armature segment 300, the jig 610 and the cooling channels 700 may also apply to this aspect.

In any of the examples disclosed herein, the segments of the armature may comprise filler elements, e.g. pre-cured components arranged to avoid that there are large differences in volume of composites that need to be cured or arranged to provide specific mechanical properties or arranged to generate holes in the final product to save material and weight.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An armature segment for an armature of a superconducting electrical machine, the armature segment comprising:
   a plurality of coils spaced along a circumferential direction;
   an electrically insulating supporting structure providing structural support to the plurality of coils; and
   wherein the coils comprise a first side portion and a second side portion, the first and second side portions connected via end portions, and the first and second side portions radially and circumferentially displaced from one another.

2. The armature segment of claim 1, wherein the electrically insulating supporting structure comprises a first electrically insulating wall, and a second electrically insulating wall placed at a radial distance from the first electrically insulating wall, the plurality of coils placed between the first and second electrically insulating walls.

3. The armature segment of claim 2, wherein the electrically insulating supporting structure further comprises an electrically insulating coil side separator extending along a circumferential direction between the first and second side portions of the coils.

4. The armature segment of claim 1, wherein the electrically insulating supporting structure comprises a composite material including fibers and resin surrounding the plurality of coils.

5. The armature segment of claim 1, further comprising a plurality of cooling channels.

6. An armature for an electrical machine, comprising a plurality of the armature segments according to claim 1 attached to an armature support structure along a circumferential direction.

7. A superconducting generator comprising:
 a magnetic field generator,
 a superconducting field winding placed concentric to the magnetic field generator; and
 the armature according to claim 6.

8. A wind turbine comprising: a tower; a nacelle on top of the tower; a rotor including one or more wind turbine blades mounted to the nacelle; and the superconducting generator of claim 7.

9. An armature segment for an armature of a superconducting electrical machine, the armature segment comprising:
 a plurality of coils spaced along a circumferential direction;
 an electrically insulating supporting structure providing structural support to the plurality of coils:
 wherein the coils comprise a first side portion and a second side portion, the first and second side portions connected via end portions, and the first and second side portions radially and circumferentially displaced from one another;
 wherein the electrically insulating supporting structure comprises a composite material including fibers and resin surrounding the plurality of coils; and
 wherein the electrically insulating supporting structure further comprises a jig in which the plurality of coils are arranged, the composite material surrounding the jig.

10. A method for assembling an armature for a superconducting electrical machine, the method comprising:
 providing a plurality of armature segments, wherein the armature segments include a plurality of coils and an electrically insulating supporting structure providing structural support to the plurality of coils;
 attaching the plurality of armature segments to an armature support structure; and
 wherein the attaching a plurality of armature segments to the armature support structure comprises attaching the armature segments to an outer armature segment support before attaching the armature segments to the armature support structure.

11. The method of claim 10, wherein the attaching a plurality of armature segments to the armature support structure comprises using a plurality of armature segment assembly carts to move the armature segments to the armature support structure.

12. The method of claim 10, wherein the attaching a plurality of armature segments to the armature support structure comprises attaching a shield to the armature support structure before attaching the armature segments to the armature support structure.

13. The method of claim 10, wherein the providing a plurality of armature segments comprises attaching a plurality of coils to a first electrically insulating wall; and attaching a second electrically insulating wall to the plurality of coils already attached to the first insulating wall.

14. A method for assembling an armature for a superconducting electrical machine, the method comprising:
 providing a plurality of armature segments wherein the armature segments include a plurality of coils and an electrically insulating supporting structure providing structural support to the plurality of coils;
 attaching the plurality of armature segments to an armature support structure; and
 wherein the providing a plurality of armature segments includes arranging a plurality of coils in a jig; surrounding the plurality of coils arranged in the jig with fibers and resin; and curing the resin.

* * * * *